United States Patent
Gerspacher et al.

(10) Patent No.: US 9,568,064 B2
(45) Date of Patent: Feb. 14, 2017

(54) CHUTE OPENER

(71) Applicants: Bryce Gerspacher, Humboldt (CA); Bud Michel, Humboldt (CA); Ron Michel, St. Gregor (CA)

(72) Inventors: Bryce Gerspacher, Humboldt (CA); Bud Michel, Humboldt (CA); Ron Michel, St. Gregor (CA)

(73) Assignee: MICHEL'S INDUSTRIES LTD, St. Gregor, Saskatchewan (CA)

( * ) Notice: Subject to any disclaimer, the term of this patent is extended or adjusted under 35 U.S.C. 154(b) by 10 days.

(21) Appl. No.: 14/594,695

(22) Filed: Jan. 12, 2015

(65) Prior Publication Data

US 2016/0201378 A1    Jul. 14, 2016

(51) Int. Cl.
  *F16H 1/06*  (2006.01)
  *A01D 41/12* (2006.01)

(52) U.S. Cl.
  CPC ............. *F16H 1/06* (2013.01); *A01D 41/1217* (2013.01)

(58) Field of Classification Search
  CPC ...... E05F 15/632; F16H 1/06; E05Y 2900/518
  See application file for complete search history.

(56) References Cited

U.S. PATENT DOCUMENTS

| | | | | |
|---|---|---|---|---|
| 5,031,829 A * | 7/1991 | Shantzis | | 232/43.2 |
| 6,988,849 B1 * | 1/2006 | Zimmerman | | 404/95 |
| 2011/0078958 A1 * | 4/2011 | Knight et al. | | 49/357 |
| 2011/0198911 A1 * | 8/2011 | Bielfelt | | 298/27 |
| 2013/0004274 A1 * | 1/2013 | Engle et al. | | 414/520 |
| 2013/0045067 A1 * | 2/2013 | Pickett et al. | | 414/345 |
| 2013/0168970 A1 * | 7/2013 | Grossman | | 290/1 A |
| 2013/0223960 A1 * | 8/2013 | Schoenfeld et al. | | 414/292 |
| 2014/0048040 A1 * | 2/2014 | Rivet | | 123/434 |
| 2014/0286731 A1 * | 9/2014 | Van Mill et al. | | 414/21 |
| 2014/0325953 A1 * | 11/2014 | Patterson et al. | | 56/500 |
| 2015/0044003 A1 * | 2/2015 | Pham | | 414/332 |
| 2015/0115688 A1 * | 4/2015 | Goedken et al. | | 298/27 |
| 2015/0225188 A1 | 8/2015 | Belluk et al. | | |
| 2015/0353291 A1 * | 12/2015 | Teichrob et al. | | |

\* cited by examiner

*Primary Examiner* — Jerry Redman
(74) *Attorney, Agent, or Firm* — Thompson Hine LLP

(57) ABSTRACT

A chute opener for opening a chute of a grain trailer is provided. The chute opener uses a motor coupled to a motor gear to drive a shaft gear. The shaft gear drives a crank shaft coupled to the chute of the grain trailer. The gears can be disengaged to enable manual operation of the chute by a hand crank. A position sensor can be provided which determines a position of the shaft gear even when disengaged from the drive gear to maintain accurate chute positioning information.

20 Claims, 11 Drawing Sheets

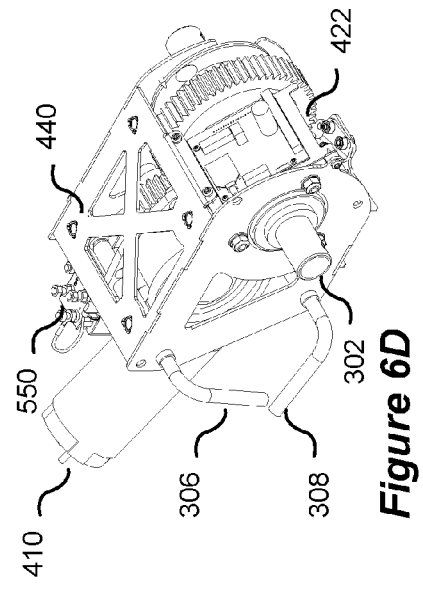
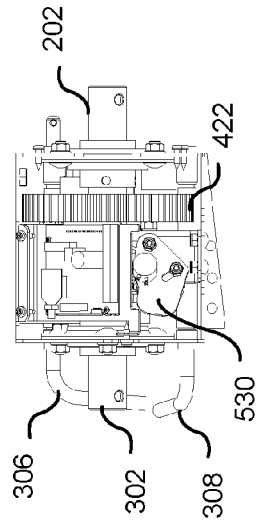
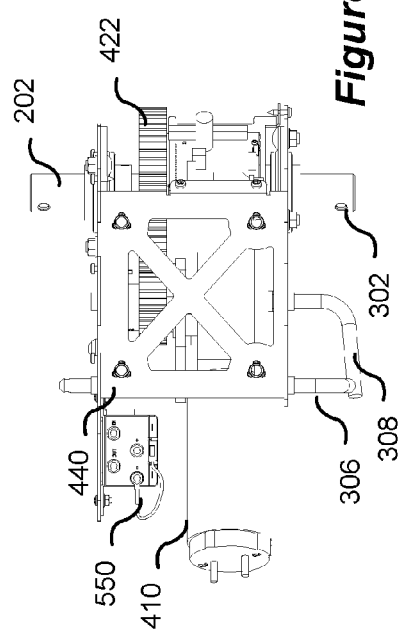
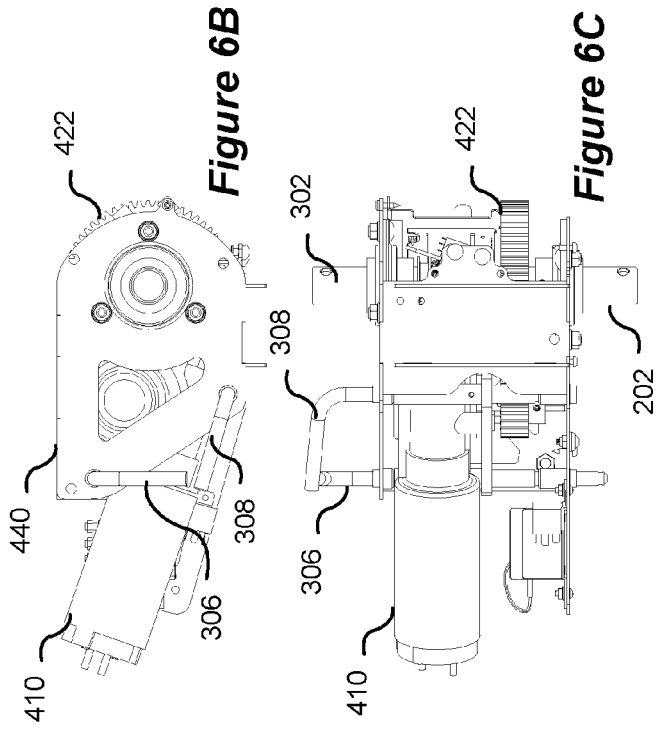

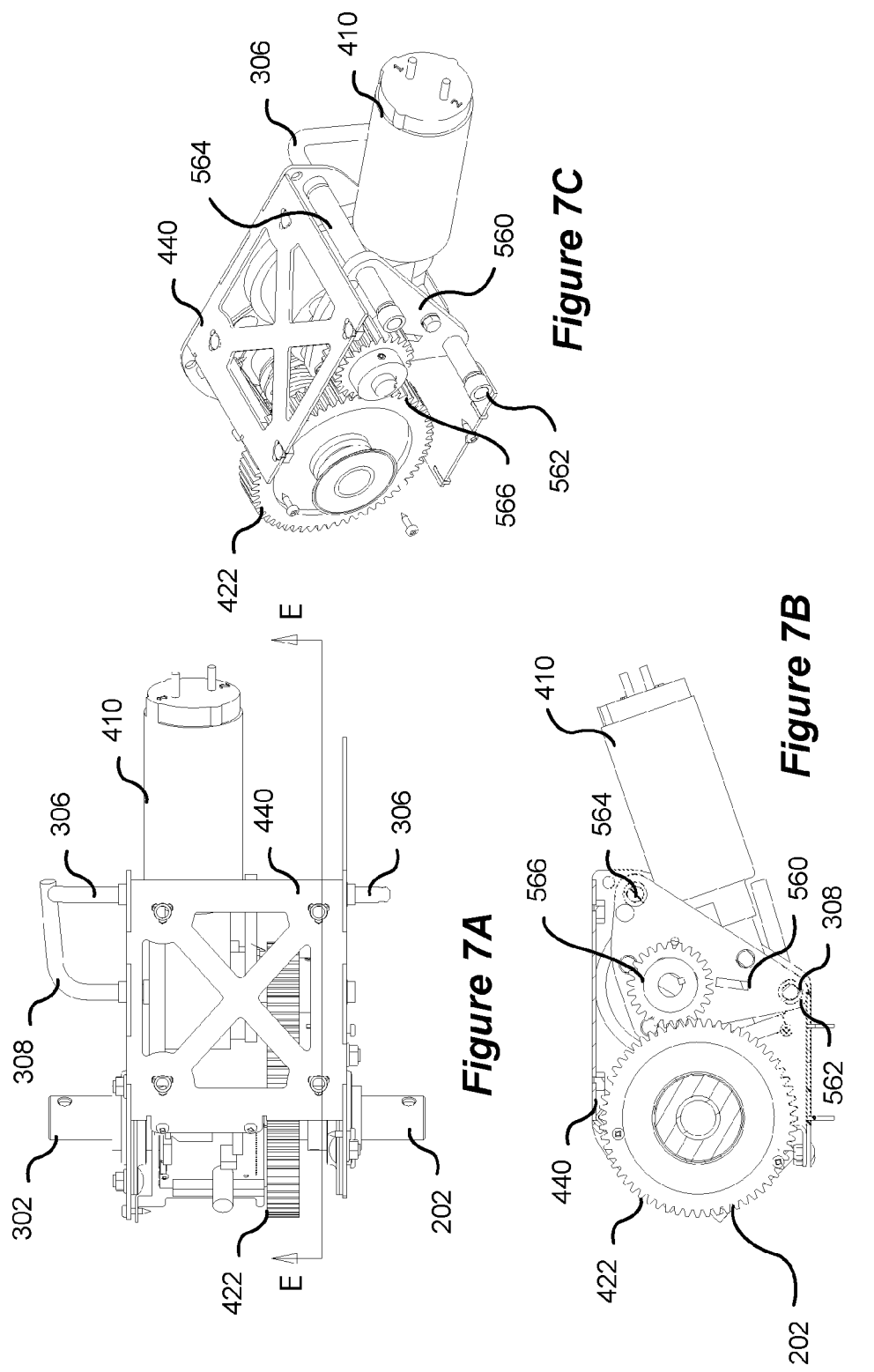

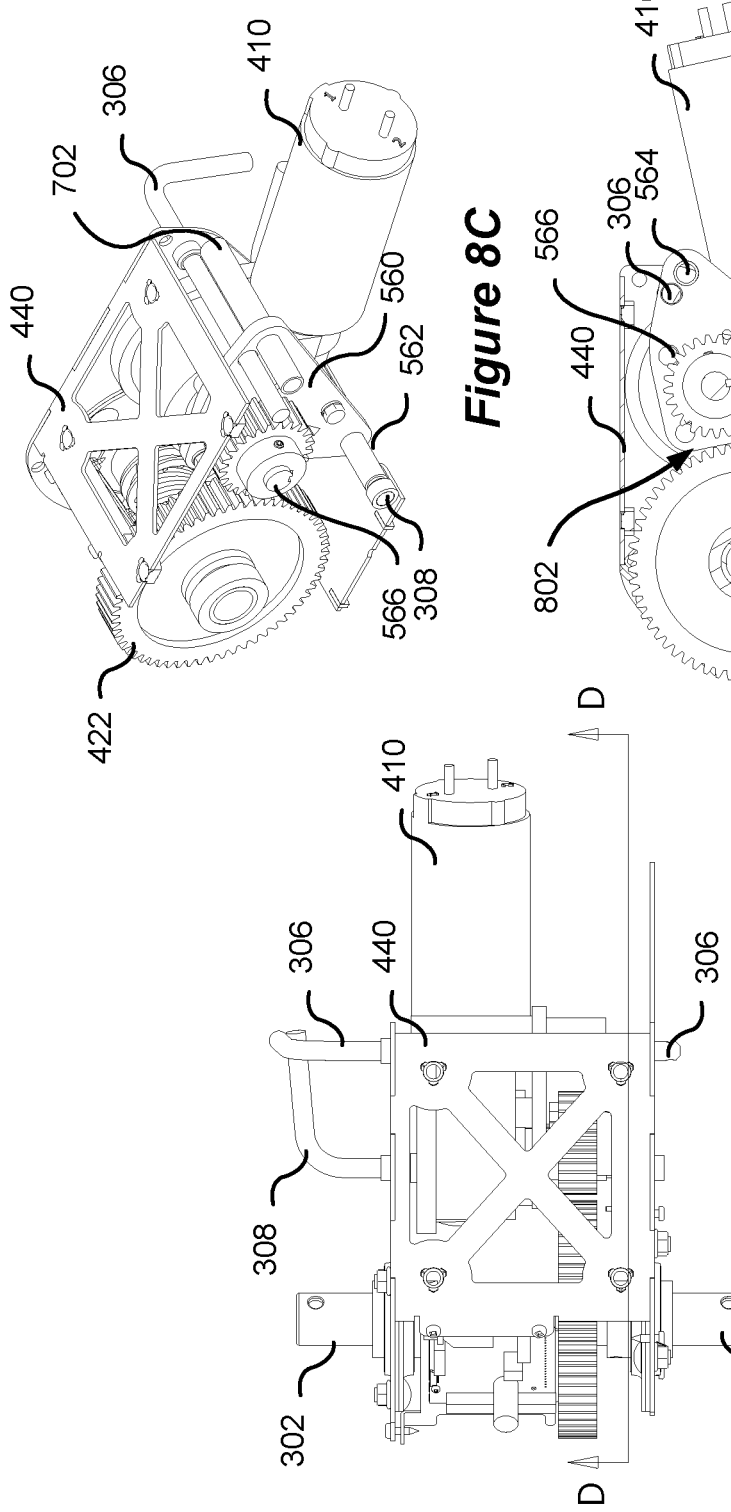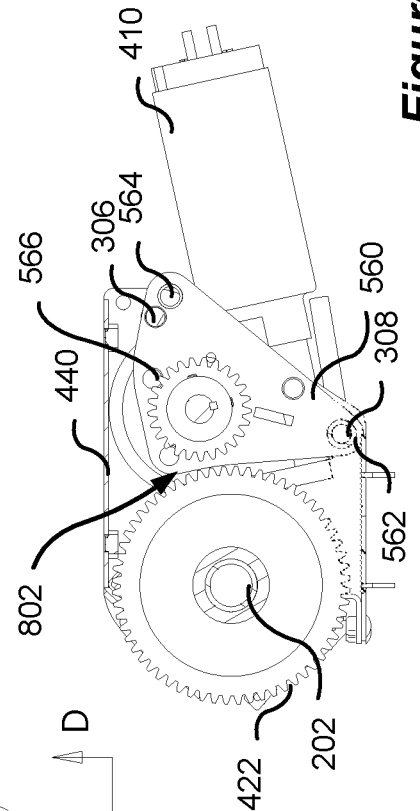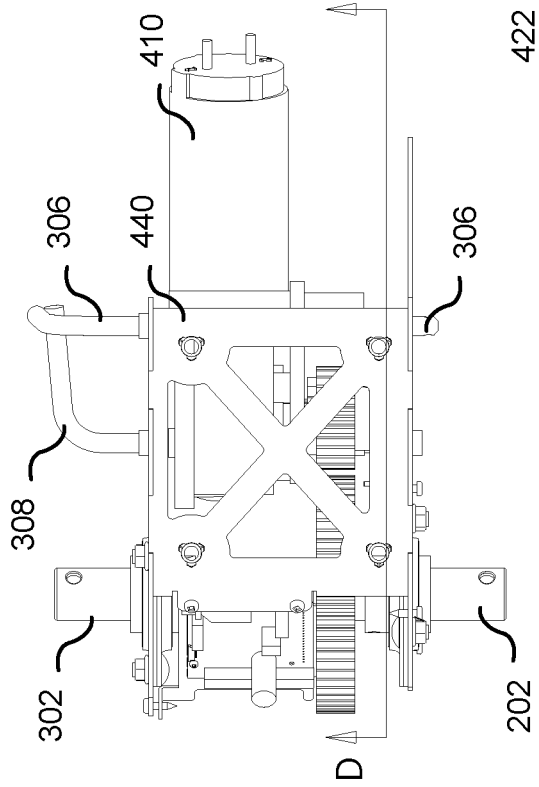

CHUTE OPENER

TECHNICAL FIELD

The present disclosure relates to chute openers and in particular to chute openers for grain trailers.

BACKGROUND

Chutes on grain trailers can be opened by the rotation of a crank to allow discharge of the contents of the trailer. The opening of the chute can be performed by manual rotation or can be opened by a powered chute opener. When chute openers are utilized manual operation of the chute can be difficult once the chute opener is installed and not provide convenient transition between automatic and manual operation. In addition manual operation can impact the automatic operation of the chute opener as manual operation can impact the calibration of the chute opener. Accordingly, an improved chute opener remains highly desirable.

BRIEF DESCRIPTION OF THE DRAWINGS

Further features and advantages of the present disclosure will become apparent from the following detailed description, taken in combination with the appended drawings, in which:

FIGS. 6A to 6E shows a top, front, bottom, perspective and side assembled views of the chute opener assembly;

FIGS. 7A to 7C shows top, cross-sectional and rear perspective views of the chute opener in the engaged position;

FIGS. 8A to 8C shows top, cross-sectional and rear perspective views of the chute opener in the disengaged position;

It will be noted that throughout the appended drawings, like features are identified by like reference numerals.

DETAILED DESCRIPTION

Embodiments are described below, by way of example only, with reference to FIGS. 1-11.

In accordance with an aspect of the present disclosure there is provided a chute opener comprising: a motor; a first gear coupled to the motor; a second gear on a shaft for rotating a crank shaft coupled to a chute wherein the second gear can be driven by the motor when engaged with the first gear; and a position sensor coupled to the second gear for determining a value associated with rotation of the second gear, wherein the position sensor is used to determine a position of the chute coupled crank shaft.

In accordance with yet another aspect of the present disclosure there is provided a chute opener assembly comprising: a shaft gear on a shaft for rotating a crank shaft coupled to a chute, the shaft gear supported by a frame; a motor bracket for supporting: a motor; a motor gear coupled to the motor; the motor bracket pivotally coupled to a frame of the chute opener assembly rotating about an axis; wherein the motor gear engages the shaft gear when the motor bracket is pivoted towards the frame and the motor gear is disengaged when the bracket is pivoted away from the frame.

Figure 1A:
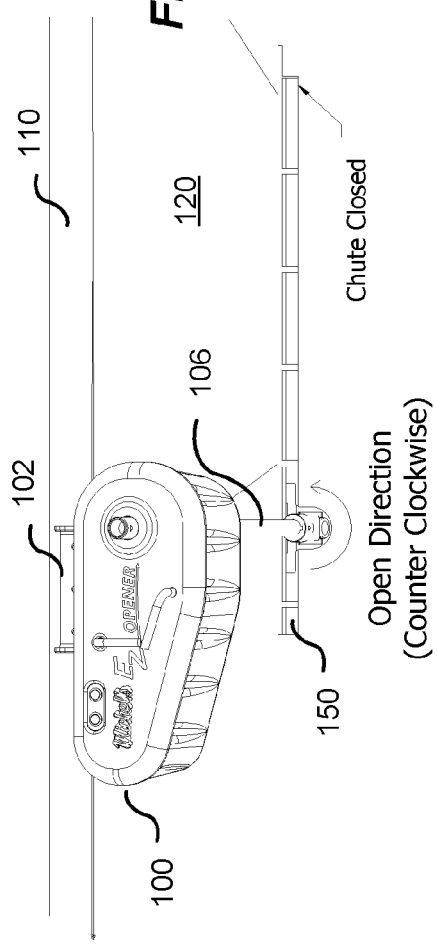
FIGS. 1A & 1B shows a chute opener installed on a trailer in a closed and an open state.
Figure 1B:
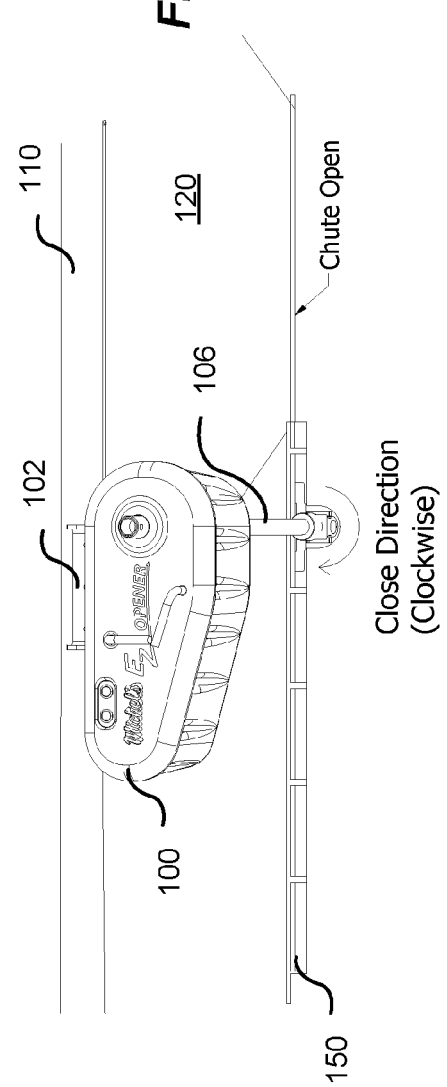

A chute opener can be connected to the chute of a grain trailer as shown in FIGS. 1A & 1B. The chute opener 100 can be mounted to the trailer 110 by a bracket 102 to facilitate the opening and closing of chute 150 of hopper 120. A crank shaft 106 couples the chute opener 100 to the chute crank to operate the chute which can be rotated to transition between a closed position shown in FIG. 1A to an open position shown in FIG. 1B.

Figure 2:
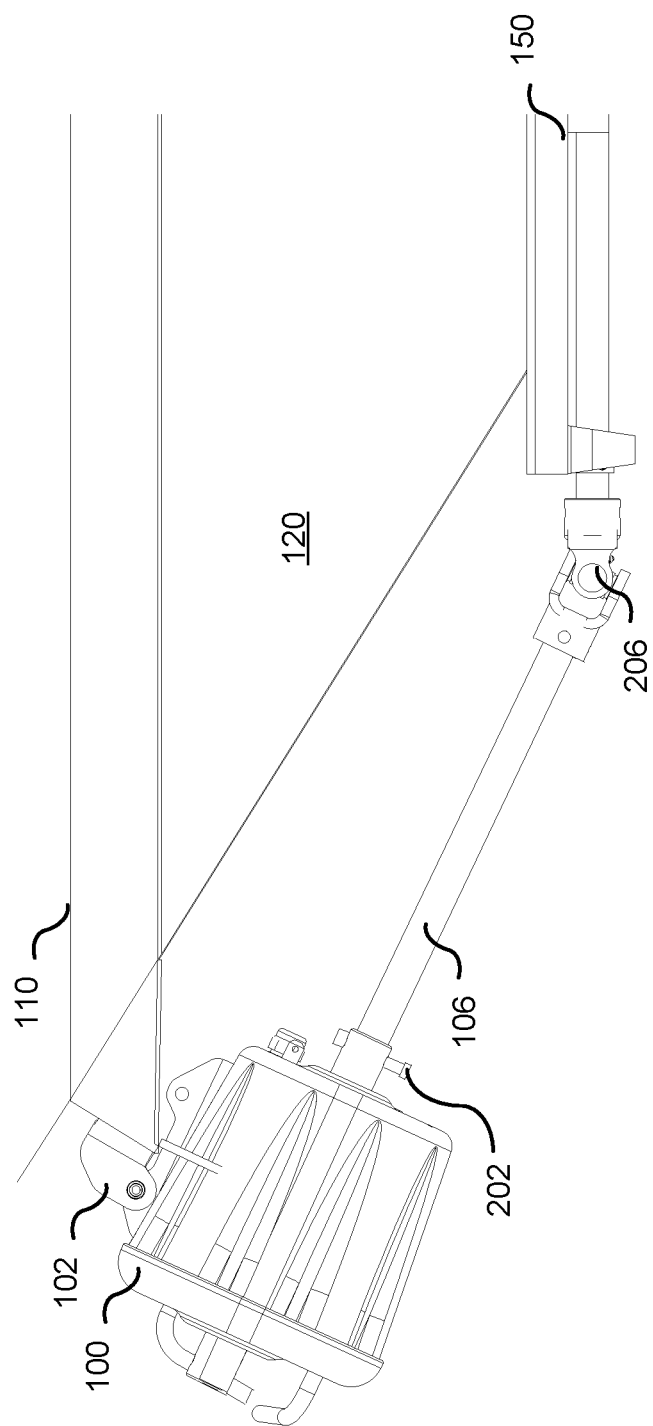
FIG. 2 shows a side view of a chute opener installation.
Figure 3B:
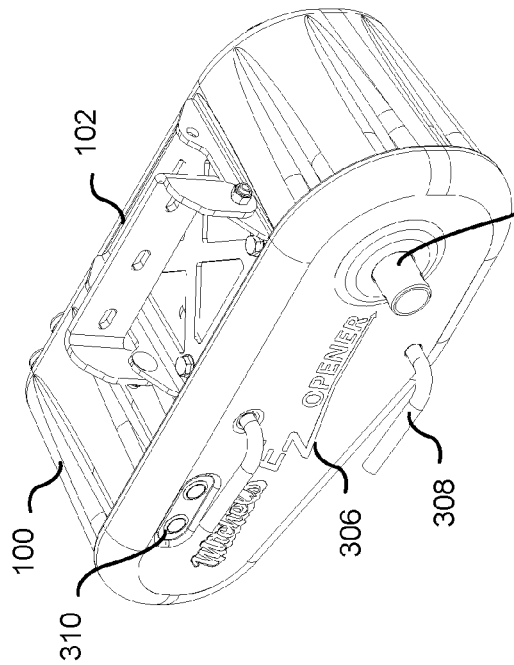
FIGS. 3A to 3D show a top, perspective, front and side views of the chute opener.
Figure 3D:
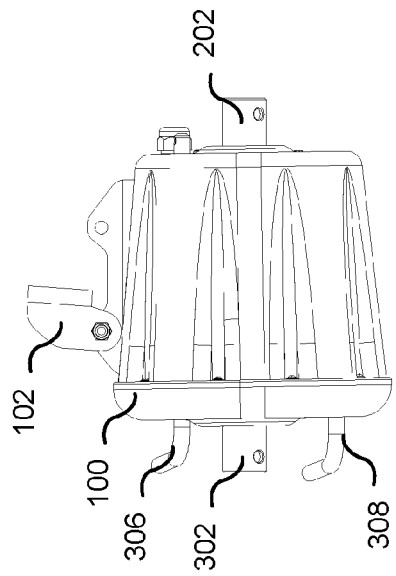
Figure 3A:
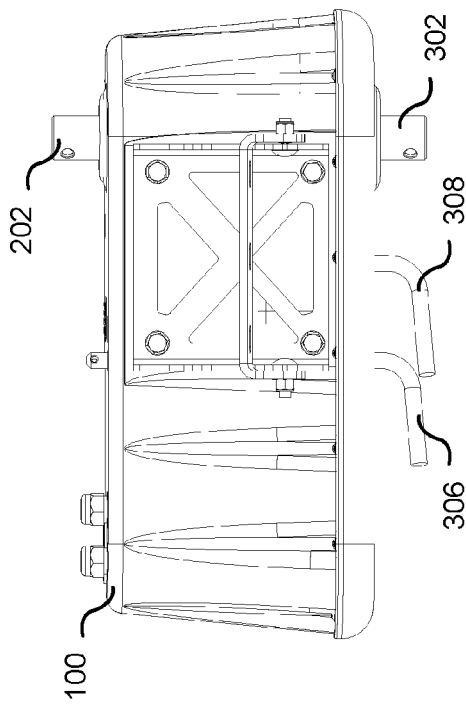
Figure 3C:
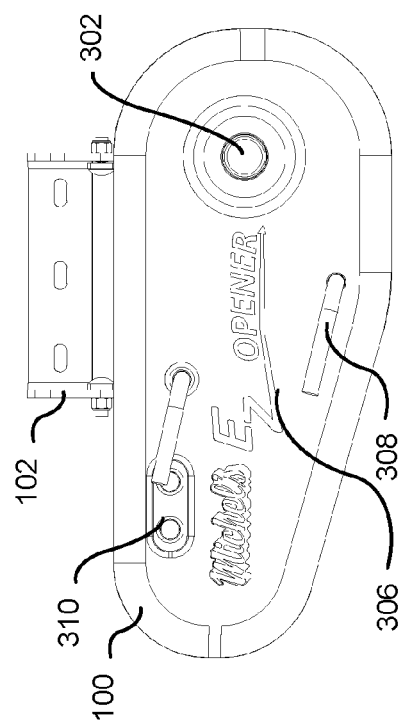

As shown in the side view of the chute opener 100 in FIG. 2, the chute opener is coupled to the crank shaft 106 by rear output shaft 202 of the chute opener 100 to a u-joint 206 coupling the opening mechanism for chute opener 100 to the chute 150. The crank shaft 106 may be connected at the output shaft 202.

Referring to FIGS. 3A to 3D, top, perspective, front and side views of the chute opener 100 are shown. The chute opener 100 has a front output shaft 302 axially connected to output shaft 202. Shaft 106 may pass from the output shaft 202 to front output shaft 302 or may be communicatively coupled there between. A handle may be attached to front output shaft 302 to enable manual operation, or to a crank shaft 106 passing there through. A lock pin 306 is provided to retain the chute opener 100 in an engaged position or automatic operation position. When the lock pin 306 is removed manual rotation of the front output shaft 302 is enabled. The motor handle 308 can be used to re-engage the motor of the chute opener from disengaged position by connecting a motor gear to a gear for rotating the crank shaft 106 as described below. The chute opener 100 may be operated by buttons 310 on the chute opener 100 or by a wireless remote. The locking pin 306 may be secured linchpins placed through a hole in the end of the pin on the back of the chute opener 100.

Figure 4:
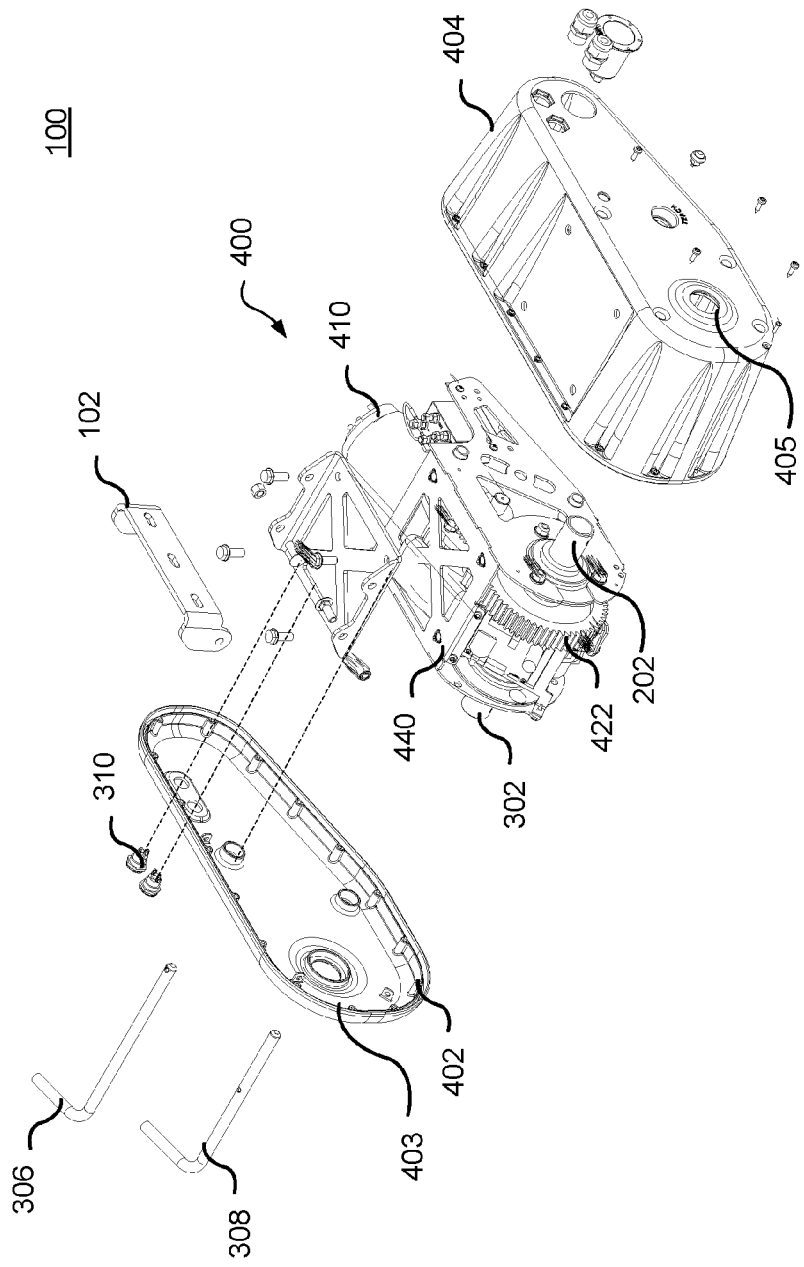
FIG. 4 shows a first exploded view of the chute opener.

FIG. 4 shows a first exploded view of the chute opener 100 showing the working components of chute opener assembly 400. A front housing 402 couples to a rear housing 404 for covering the chute opener assembly 400 having a frame 440. The front housing 402 has an opening 403 for receiving output shaft 302 and rear housing 404 has a matching opening 405 for receiving output shaft 202. A direct current (DC) motor 410 is coupled by a motor gear (not visible) to a crank shaft gear 422 for rotating the output shaft 202 coupled to the frame 440.

Figure 5:
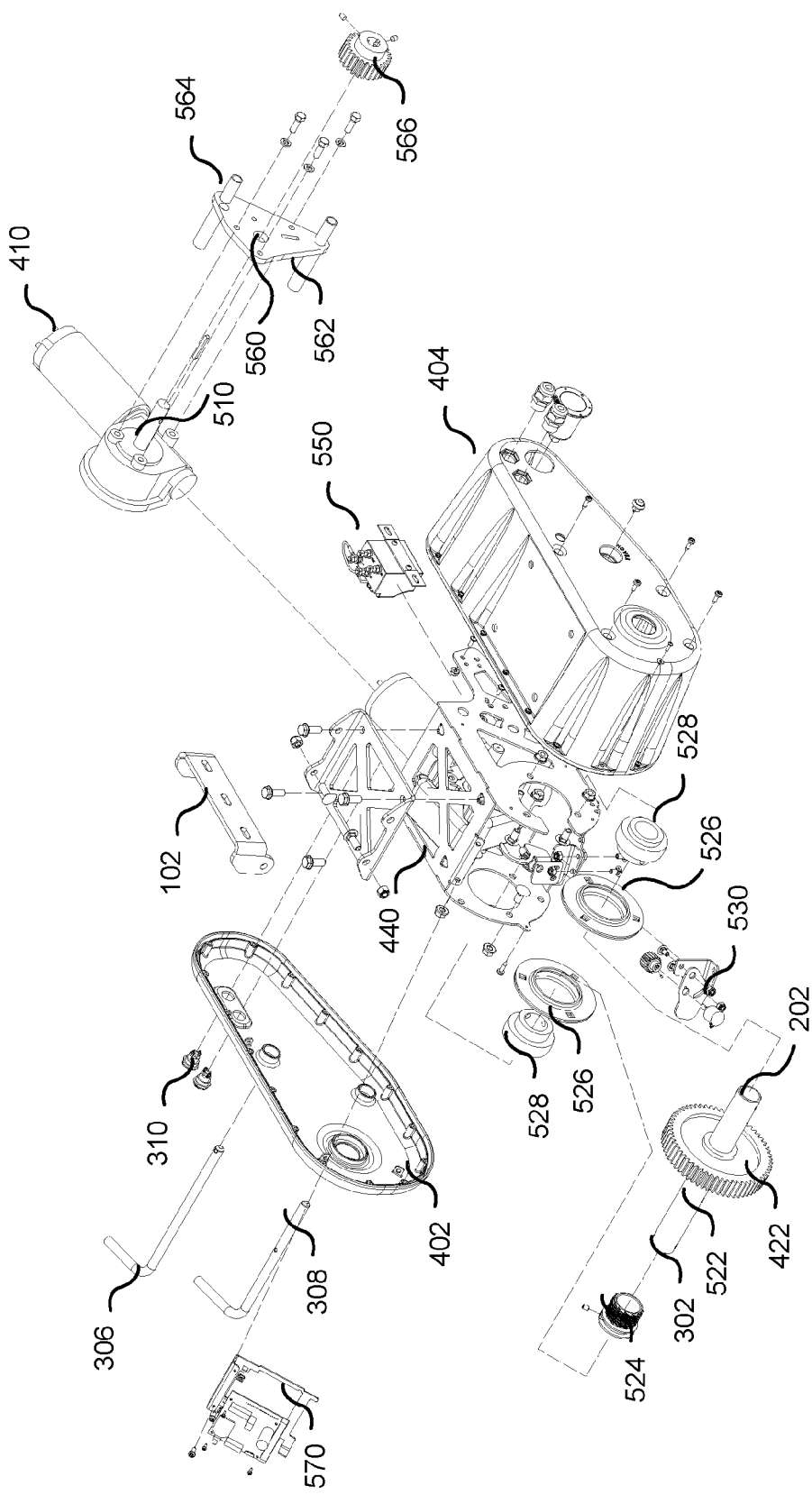
FIG. 5 shows an exploded view of the chute opener assembly.

Referring to FIG. 5 and FIG. 6, FIG. 5 shows an exploded view of the chute opener assembly 400 and FIGS. 6A to 6E shows a top, front, bottom, perspective and side assembled views of the chute opener assembly 400. The front output shaft 302 is coupled to the rear output shaft 202 provided by shaft 522 on having gear 422. A worm gear 524 is provided on the shaft 522 for rotating a gear of a position sensor 530 such as a potentiometer. Although a rotational potentiometer is depicted a liner potentiometer or other position sensor may be utilized to determine distance traveled. A position sensor 530 which can determine absolute or relative position of the gear, or can generate a value that it can be determined the position of the gear can be utilized. The position sensor 530 can generate a value that is used to determine a position even if the gear is manually rotated and then reengaged. The position sensor 530 may be provided by a potentiometer where the position is changed by rotation of the shaft to translate rotation of an electrical value. Alternatively the position sensor 530 may utilize other positioning sensors such as inductive position sensors or rotary encoders. The shaft 522 may be contained within the frame 440 by flangettes 526 and bearings 528. As the shaft 522 rotates the rotation is translated by the position sensor 530 to determine the amount of movement chute 150 based upon a calibration of the sensor to determine open and closing positions. A reverse DC contactor 550 connects power to the motor 410 which is controlled by a controller 570 providing forward and reversing functions of the motor 410. The motor 410 is connected to a motor bracket 560 and drives a motor gear 566 by shaft 510 for matting with gear 422. The bracket 560 is pivotally connected to frame 440 by motor handle 308. The gear 422 and motor gear 566 may be spur gears. Other types of gear profiles or orientations may be utilized based upon the orientation of the motor 410 and motor gear 566 relative to main gear 422. The motor bracket 560 has a locking pin sleeve 564 for receiving the locking pin 306 to keep the motor gear 566 engaged with gear 422 when rotated towards the frame 440. The motor bracket 560 may also have motor handle sleeve 562 for receiving the motor handle 308 to enable movement of the motor bracket 560 to engage or disengage the gears and coupling the bracket 560 to the frame 440.

Figure 9A:
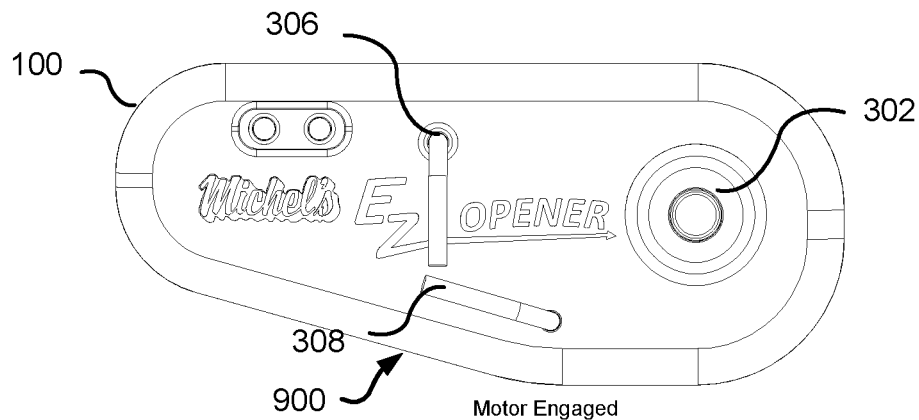
FIGS. 9A to 9C show operation of a locking pin and motor handle to engage and disengage the chute opener between automatic and manual operation.

FIGS. 7A to 7C shows top, cross-sectional and perspective views of the chute opener in the engaged position. In top view of FIG. 7A, a sectional line EE is shown in side view in FIG. 7B. In the operational or engage position the gear 422 is meshed or engaged with gear 566. Referring to FIG. 7C, the locking pin 306 maintains engagement of the gears through locking pin sleeve 564 engaging frame 440 as shown in the front view of FIG. 9A. The motor bracket 560 is rotated around motor handle 308 to enable meshing of the gears. In FIG. 9A the motor drive handle 308 is in an engaged position 902.

Figure 9B:
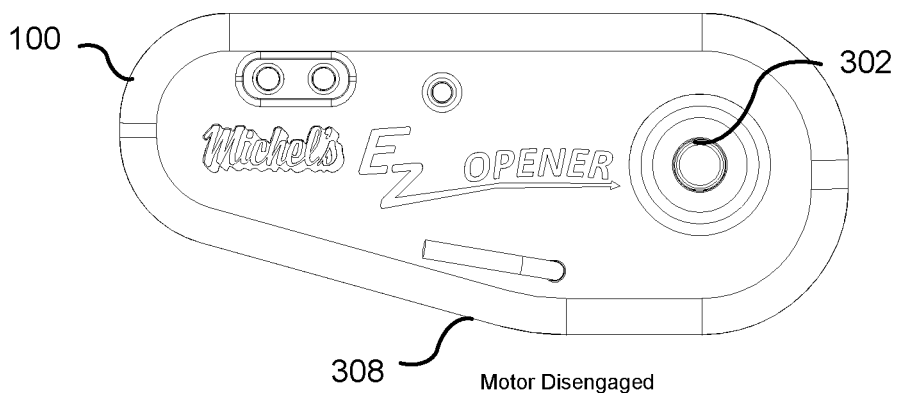
Figure 9C:
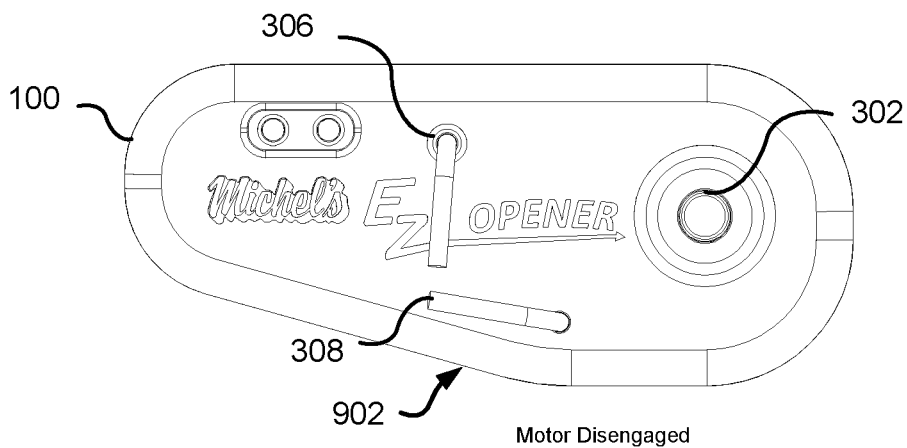

FIGS. 8A to 8C shows top, cross-sectional and perspective views of the chute opener in the disengaged position. In top view of FIG. 8A, a sectional line DD is shown in side view in FIG. 8B. In the disengaged position the pin 306 is removed from the locking pin sleeve 564 as shown in FIG. 9B and may be inserted in a secondary position to support the motor 410 when not engaged as shown in FIG. 9C. As shown in FIG. 8B when gears are not engaged a space 802 is provided between the gear 422 and gear 566. When the gears are not engaged, the drive handle 308 is in position 902. The gears may be re-engaged by removing the locking pin 306 and rotating handle 308 to position 900 to move the motor and gear forward for re-engagement and re-inserting locking pin 306 in sleeve 564. When the gears are re-engaged a value can be determined from the position sensor as the manual movement of the gear 422 would change the position of the potentiometer therefore enabling chute position always to be determined. The position sensor such as the potentiometer does not need to be re-calibrated when switching between manual and remote operation as the position of the position sensor changes with any movement of the gear 422.

Figure 10:
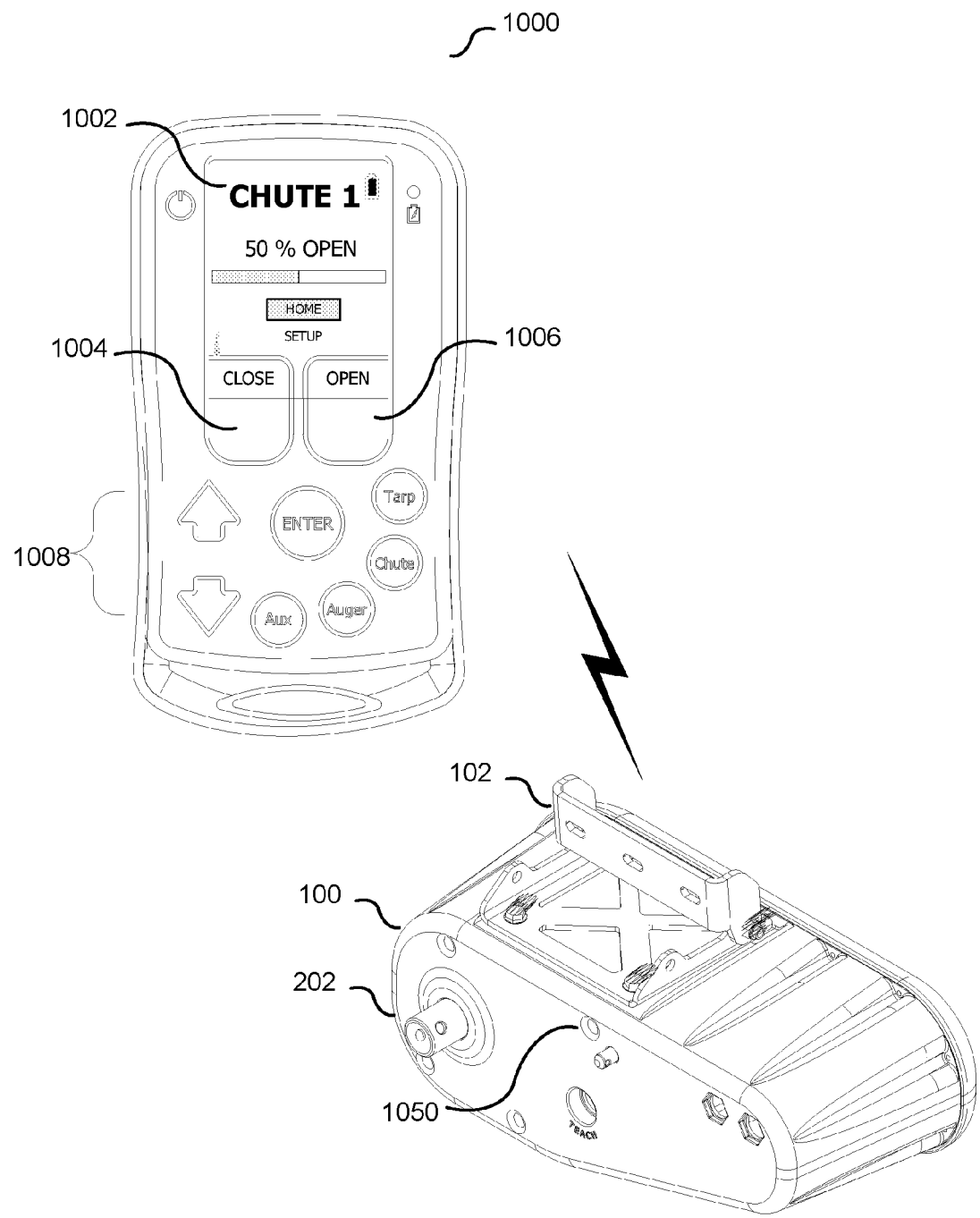
FIG. 10 shows a wireless remote and the chute opener.

FIG. 10 shows a wireless remote 1000 and the chute opener 100. The wireless remote 1000 has display 1002 for providing information on the status of the chute opener 100. The operation of the chute opener can be controlled by a close button 1004 and open button 1006. Input buttons 1008 may also be provided to interface with the wireless controller 1000 and the chute opener 100. The display 1002 can identify a chute opening status of the chute and present information such as an open percentage. The position sensor 530 used to determine the amount of rotation of the gear 422 and therefore can be used to determine the opening position of the chute 150 and an open percentage. The wireless remote 1000 can be wirelessly paired with the chute opener 100 having a teach button 1050.

Figure 11:
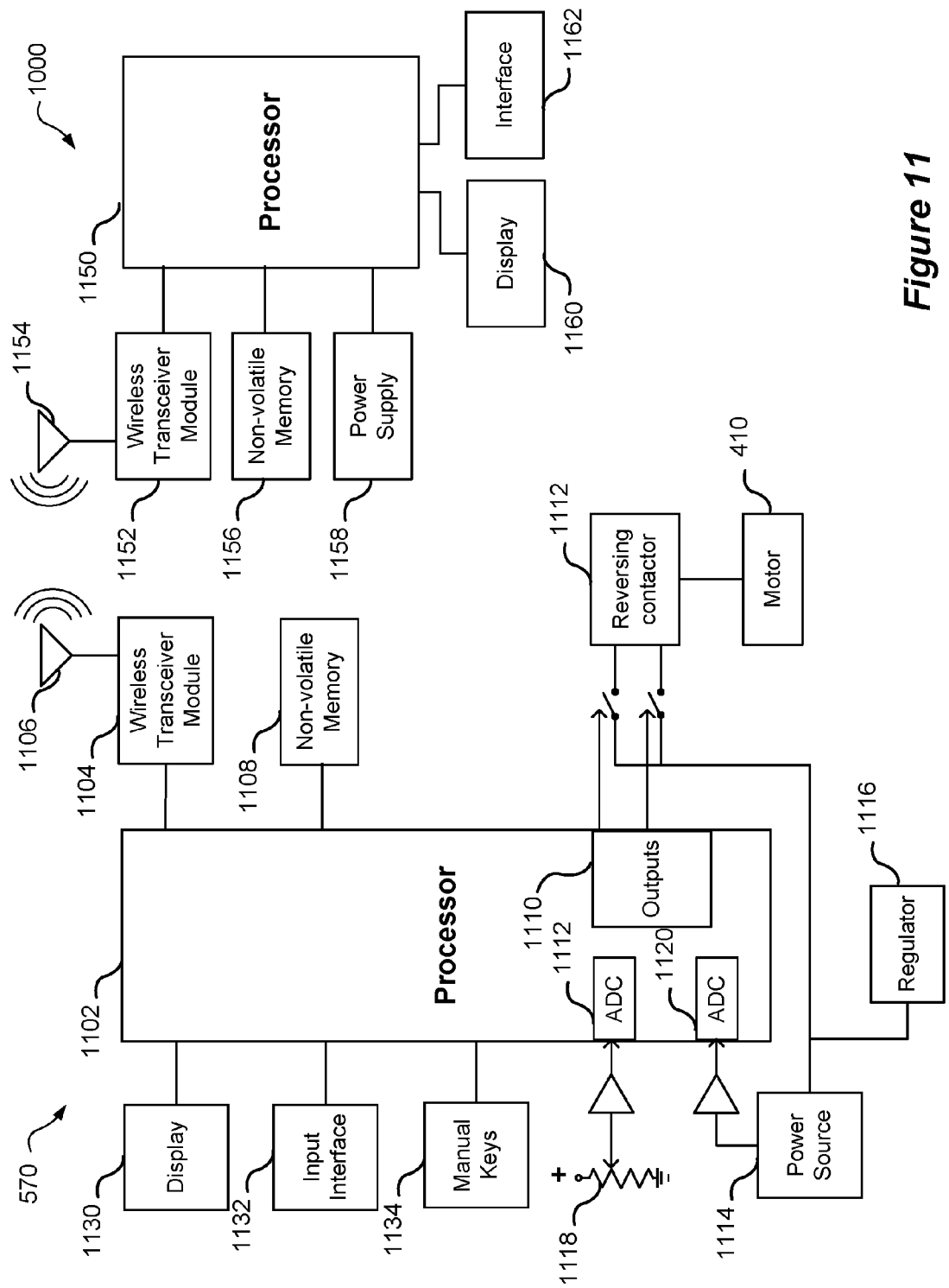
FIG. 11 shows system diagram of the wireless remote and controller of the chute opener.

FIG. 11 shows system diagram of the wireless remote and controller of the chute opener. The chute opener 100 controller 570 has chute processor 1102 for controlling operation of the chute. The chute processor 1102 is coupled to a chute wireless transceiver module 1104 providing wireless communication through a chute transceiver antenna 1106. The wireless transceiver can utilize short range radio frequency two-way communication technologies or IEEE 802.15 personal area networks (PAN) wireless technology such as but not limited to Xbee™, ZigBee™, Z-Wave™, ISA100.11a, WirelessHART™, MiWi™, or 6LoWPAN or 802.11 local area network (LAN) technologies such as Wi-Fi™ or proprietary or non-proprietary wireless technologies. The chute processor 1102 is coupled to a non-volatile memory 1108 containing instructions for the operation of the chute opener 100. An output display 1130 may be provided to display a status of the state of the chute opener. An input interface 1132 such as a keypad, buttons, or touch interface, buttons or manual entry keys 1134 may be provided to allow configuration if the wireless remote 1000 is not utilized. A power source 1114 interfaces with the processor 1102 and power regulator 1116, which may regulate power to for example to 3.3 V. A potentiometer 1118 provided by a position sensor module 530 interfaces to the processor 1102. The potentiometer 1118 is adjusted by rotation of the worm gear 524. The output of the potentiometer 1118 is provided to an analog to digital converter (ADC) 1122 to provide a digital output value to the processor 1102. The potentiometer 1118 can be calibrated to associate an opening position and a closing position with a voltage value. An ADC 1120 may also be provided to determine state of the power source 1114. Output 1110 to control reversing contactor 550 for the operation of the motor 410. The reversing contactor 550 can be utilized to engage the motor 410 in the forward or reverse direction depending on the received command to open or close the chute 150. The potentiometer 1118 can be calibrated against the position of the chute 150 to provide a percentage to determine the state of the chute 150.

The wireless remote 1000 has a wireless remote processor 1150 coupled to wireless remote transceiver module 1152 to communicate with the chute opener 100 via antenna 1154. The communication may be one-way or two-way communication. Non-volatile memory 1156 is provided for storing operating instructions for generating a user interface on display 1160, receiving input via interface 1162, generating commands to be sent to the chute opener controller and receiving feedback or information from the controller. A power supply 1158 such as a battery can be provided to enable portability. Alternatively the remote may be hardwired to power supply. The wireless remote 1000 may be paired with the controller 570 by a pairing or learning process. The wireless remote 1000 may be configured to control multiple chute openers or other accessories.

It would be appreciated by one of ordinary skill in the art that the system and components shown in FIGS. 1-11 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

The invention claimed is:

1. A chute opener comprising:
   a motor;
   a first gear coupled to the motor;
   a second gear on a shaft for rotating a crank shaft coupled to a chute wherein the second gear can be rotated by the first gear when driven by the motor, and wherein the second gear can be disengaged from the first gear so that the shaft can be manually rotated; and
   a position sensor coupled to the second gear for determining a value associated with rotation of the second gear either by the motor or by manual rotation of the shaft, wherein the position sensor is used to determine a position of the crank shaft, which is coupled to the chute.

2. The chute opener of claim 1 further comprising a controller for controlling an operation of the motor and determining the position from the position sensor.

3. The chute opener of claim 2 wherein the controller has a wireless transceiver for receiving commands from a wireless remote.

4. The chute opener of claim 3 further comprising sending a status value to the wireless remote from the controller.

5. The chute opener of claim 1 wherein the position sensor is rotated by the second gear disengaged from the first gear and the shaft is rotated by manual operation.

6. The chute opener of claim 5 wherein the position sensor is a potentiometer.

7. The chute opener of claim 6 wherein a gear of the potentiometer engages a worm gear on the shaft.

8. The chute opener of claim 7 wherein an analog to digital converter (ADC) converts a signal from the potentiometer to a digital value.

9. The chute opener of claim 8 wherein the digital value is mapped to a position of the chute.

10. The chute opener of claim 9 wherein a position value is provided to a wireless remote for display on the wireless remote as a percentage that the chute is opened or closed.

11. The chute opener of claim 1 wherein the motor and first gear are coupled to a motor bracket, wherein the motor bracket is pivoted away from the second gear when disengaged from the first gear.

12. The chute opener of claim 1 wherein the first and second gear maintain engagement by a locking pin.

13. The chute opener of claim 1 further comprising a reverse DC contactor for driving the motor in a forward or backward direction.

14. The chute opener of claim 1 wherein the chute opener is secured by a bracket to a trailer.

15. A chute opener assembly comprising:
    a shaft gear on a shaft for rotating a crank shaft coupled to a chute, the shaft gear supported by a frame;
    a motor bracket for supporting:
      a motor;
      a motor gear coupled to the motor;
      the motor bracket pivotally coupled to a frame of the chute opener assembly rotating about an axis;
    wherein the motor gear engages the shaft gear when the motor bracket is pivoted towards the frame and the motor gear is disengaged when the motor bracket is pivoted away from the frame wherein the shaft gear can be rotated by the motor when engaged with the motor gear or rotated by manual operation when disengaged from the motor gear.

16. The chute opener of claim 15 wherein the motor bracket is locked in an engaged position by a lock pin coupling the motor bracket to the frame.

17. The chute opener of claim 16 wherein the motor bracket pivots about a handle supported through the frame.

18. The chute opener of claim 16 wherein the shaft gear is coupled to a position sensor for determining a value associated with rotation of the shaft gear, wherein the position sensor is used to determine a position of the crank shaft, which is coupled to the chute.

19. The chute opener of claim 18 wherein the position sensor is rotated by the shaft gear disengaged from the motor gear.

20. The chute opener of claim 19 wherein the position sensor is a potentiometer.

* * * * *